(12) United States Patent
Mishra et al.

(10) Patent No.: US 8,868,909 B2
(45) Date of Patent: Oct. 21, 2014

(54) METHOD FOR AUTHENTICATING A COMMUNICATION CHANNEL BETWEEN A CLIENT AND A SERVER

(75) Inventors: Pravat K Mishra, Union City, CA (US);
Anupam Ratha, Selangor (MY);
Vikram Sareen, Kuala Lumpur (MY)

(73) Assignee: Ezmcom, Inc., Sunnyvale, CA (US)

( * ) Notice: Subject to any disclaimer, the term of this patent is extended or adjusted under 35 U.S.C. 154(b) by 444 days.

(21) Appl. No.: 12/442,526

(22) PCT Filed: Dec. 19, 2008

(86) PCT No.: PCT/US2008/087845
§ 371 (c)(1),
(2), (4) Date: Mar. 23, 2009

(87) PCT Pub. No.: WO2009/082717
PCT Pub. Date: Jul. 2, 2009

(65) Prior Publication Data
US 2010/0185860 A1    Jul. 22, 2010

Related U.S. Application Data

(60) Provisional application No. 61/003,525, filed on Nov. 19, 2007.

(51) Int. Cl.
*H04L 29/06* (2006.01)
(52) U.S. Cl.
CPC .................................. *H04L 63/0869* (2013.01)
USPC .......................................... 713/169; 713/171
(58) Field of Classification Search
CPC .... H04L 63/0869; H04L 63/08; H04L 63/062
See application file for complete search history.

(56) References Cited

U.S. PATENT DOCUMENTS

| | | | |
|---|---|---|---|
| 7,206,934 B2 | 4/2007 | Pabla et al. | |
| 7,275,102 B2 | 9/2007 | Yeager et al. | |
| 7,484,225 B2 | 1/2009 | Hugly et al. | |
| 2005/0144449 A1* | 6/2005 | Voice | 713/169 |
| 2007/0087756 A1 | 4/2007 | Hoffberg | |
| 2007/0220253 A1* | 9/2007 | Law | 713/168 |
| 2008/0077796 A1* | 3/2008 | Lund et al. | 713/173 |
| 2009/0259848 A1* | 10/2009 | Williams et al. | 713/168 |

OTHER PUBLICATIONS

State Services Commission 2006. Guidance on Multi-factor Authentication. New Zealand e-government interoperability framework (NZ e-GIF). Version 1.0.
ISO/IEC 7498-1:1994. Open Systems Interconnection—Basic Reference Model: The Basic Model.
TLS (Transport Layer Security); RFC 2246; Jan. 1999.

(Continued)

*Primary Examiner* — Izunna Okeke
(74) *Attorney, Agent, or Firm* — Sawyer Law Group, P.C.

(57) ABSTRACT

A method for authenticating a communication channel between a client and server has been disclosed. The method employs a mutual authentication payload (MAP) protocol that enables mutual authentication between a client and server system in a convenient user-friendly manner while providing seamless and automated portability to the clients. In the process of mutual authentication, the client verifies that the server entity is indeed the intended entity and is trusted. Likewise, the server verifies if the client entity initiating the exchange is indeed the intended entity and is trusted. Accordingly, this verification process involves multi-factor authentication factors contained within the MAP protocol.

31 Claims, 9 Drawing Sheets

(56) References Cited

OTHER PUBLICATIONS

Guidance on how Financial Institutions can protect against Pharming attacks. FDIC (Federal Deposit Insurance Corporation)—A letter to financial institutions.

RSA Public Key algorithm. W. Diffie, The first ten years of public-key cryptography, Proceedings of the IEEE 76 (1988), 560-577.

Use of Elliptic Curve Cryptography (ECC) Algorithms in Cryptographic Message Syntax (CMS). RFC 3278. Apr. 2002.

Phishing.

[FFIEC] Federal Financial Institutions Examination Council. Oct. 12, 2005. FFIEC guidance—Authentication in an Internet Banking Environment (FIL-103-2005).

[RFC 2289] A One-Time Password System, RFC 2289, Feb. 1998.

* cited by examiner

METHOD FOR AUTHENTICATING A COMMUNICATION CHANNEL BETWEEN A CLIENT AND A SERVER

FIELD OF THE INVENTION

The present invention relates generally to client/server system and more specifically to a method for authenticating a communication channel between a client and a server.

BACKGROUND OF THE INVENTION

The Internet is a powerful, inexpensive and convenient channel for enterprises to allow its customers to perform transactions electronically. It is also one of the most challenging channels to secure and build trust between two parties. With evolution in the internet commerce, its adoption and its awareness, so have the various threats increased over time.

The most visible threat is the process of identity theft whereby, in an internet system the authentication credentials that identify a user are thieved by a fraudster. This process known as Phishing leads to the fraudster assuming the identity of a legitimate user with the internet system. Such identity thefts are typically successful when authentication of the internet system relies on a single authentication factor such as a fixed username and password.

To tackle such identity theft and threats, authentication systems are enhanced with 2nd Factor Authentication (2FA) where user is expected to possess a device decoupled and independent in nature to the internet system. The device generates a One-Time-Password (OTP). This methodology has proven somewhat successful at thwarting the Phishing attempts, but more modified threats such as Man-In-The-Middle (MITM), Pharming, Over-The-Air SMS/data sniffing, third party infrastructure hijacking, Trojans, key loggers and combinations thereof, can render a 2FA solution ineffective.

For example, a MITM attack can typically be executed as a reverse-proxy approach by a fraudster whereby a user is beguiled into supplying the necessary 2FA OTP or a challenge-response to the fraudster who relays the same in real-time (proxy) with fraudulent transactions.

An authentication methodology immune to above described attacks is possible when mutual authentication is implemented. In such an authentication system the client and server validate and verify each other before a session is started. Typically in the conventional mutual authentication approach, the client is expected to keep possession of a Digital Certificate that is used in the process of Authentication. There is a two-way authentication in which the user is expected to first visually verify, acknowledge the server's Digital Certificate credentials and the server subsequently validates and verifies the client's Digital Certificate.

However, this methodology relies on three factors:
1. The user must visually verify and acknowledge if the legitimate server is in-fact communicating with the client. Here, the user needs to be able to discern the Digital Certificate details that rightly identify the legitimate server.
2. In an internet system, the users are typically roaming and the user is expected to be in possession of a Digital Certificate and his Private Key at all the times. If not, authentication is not possible and user will be unable to access the appropriate server. Accordingly, the user needs to carry around the Digital certificate and the Private Key in some portable device and optionally protect the private key with a pass phrase. Also the user must protect the theft of Digital Certificate and Private Key, the loss of which would compromise his identity.
3. Implementation of such an authentication system relies on Transport Layer Security (TLS) [3] and requires the APPLICATION to trust the transport layer devices and protocols for authentication.

Each of the above delineated factors rely on the user's active participation and judgment in the process. However, oftentimes users are not capable of discerning appropriateness of Digital Certificates and neither are they fully aware, capable of protecting the private key. Moreover, in a typical internet system, roaming capabilities are expected by default and for that users need to carry around Private Keys in some portable device such as USB, FOB, Dongle etc. Not only does it add the cost of the internet system but it also increases the level of inconvenience for users.

SUMMARY OF THE INVENTION

In varying embodiments, the present inventive concepts relate to a method and system for mutually authenticating a client and server in communication over a network. The method and system employ a mutual authentication payload (MAP) protocol that enables mutual authentication between a client and server system in a convenient user-friendly manner while providing seamless and automated portability to the clients.

A first embodiment is method for authenticating a communication channel between a client and server comprising generating a multi-factor authentication (MFA) key, creating a mutual authentication payload (MAP) from the MFA key, exchanging the MAP between the client and server for authentication and performing integrity verification and content validation of the MFA key contained in the MAP.

A second embodiment is a computer-readable medium having computer-executable instructions for performing a method for authenticating a communication channel between a client and server, the method comprising generating a multi-factor authentication (MFA) key, creating a mutual authentication payload (MAP) from the MFA key, exchanging the MAP between the client and server for authentication and performing integrity verification and content validation of the MFA key contained in the MAP.

Other aspects and advantages of the present invention will become apparent from the following detailed description, taken in conjunction with the accompanying drawings, illustrating by way of example the principles of the invention.

DETAILED DESCRIPTION

The present disclosure relates to a method for mutually authenticating a communication channel between a client and server. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

Figure 1:
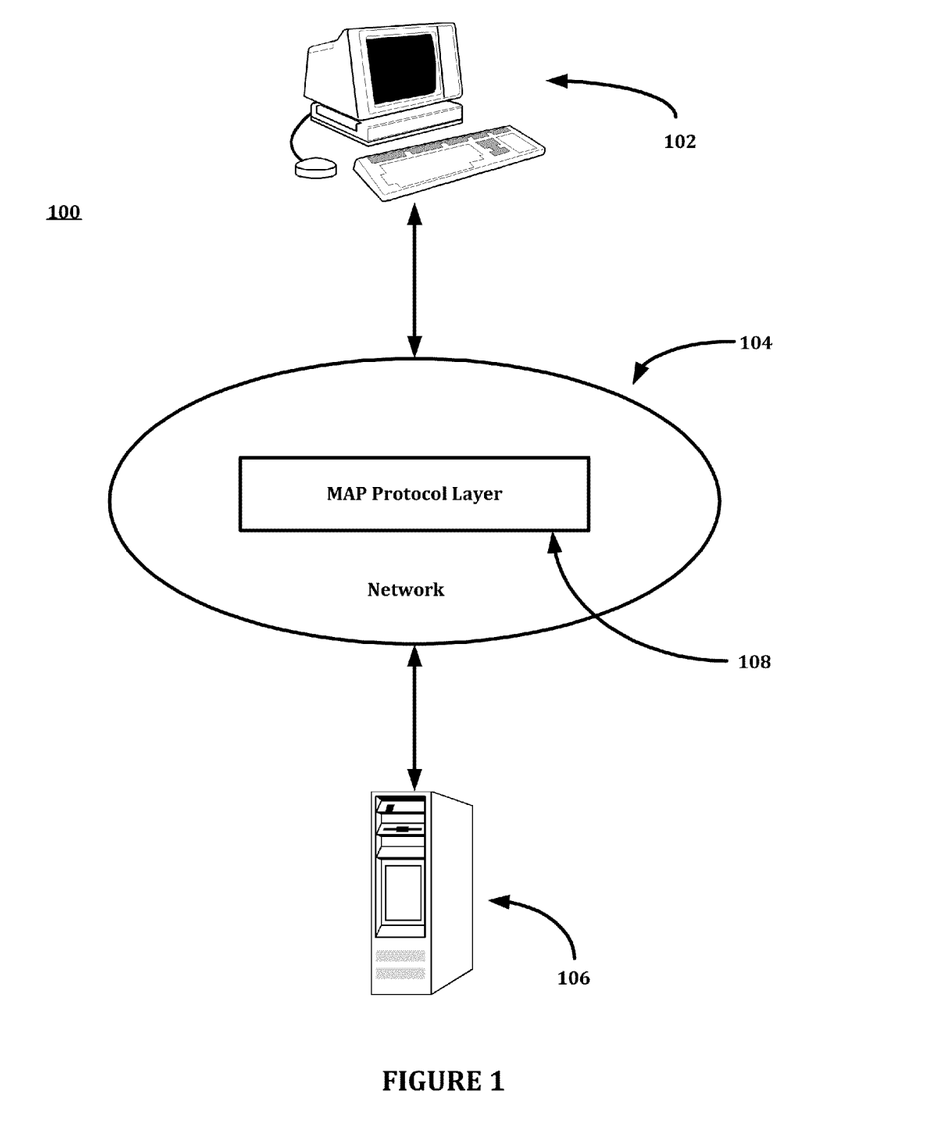
FIG. 1 shows a client/server system in accordance with an embodiment.

FIG. 1 shows a client/server system 100 in accordance with an embodiment. The system 100 includes a client systems 102, a Mutual Authentication Payload (MAP) protocol layer 108 and a server database 106. A client/server architecture is an architecture in which the user's PC (the client 102) is the requesting machine and the server 106 is the supplying machine, both of which are connected via a network 104.

An exemplary client system 102, in its basic configuration, typically includes a processing unit and memory. Depending on the exact configuration and type of computing device, memory 120 may be volatile (such as RAM), non-volatile (such as ROM, flash memory, etc.) or some combination of the two. Additionally, device 102 may also have mass storage (removable and/or non-removable) such as magnetic or optical disks or tape. Similarly, device 102 may also have input devices and/or output devices. Other aspects of device 102 may include network connection to other devices, computers, networks, servers, etc. using wired or wireless media. All these devices are well known in the art and need not be discussed at length here.

The MAP protocol layer 108 enables mutual authentication between a client and server system in a convenient user-friendly manner while providing seamless and automated portability to the clients. In the process of mutual authentication, the client verifies that the server entity is indeed the intended entity and is trusted. Likewise, the server verifies if the client entity initiating the exchange is indeed the intended entity and is trusted. Accordingly, this verification process involves multi-factor authentication factors contained within the MAP protocol.

In an embodiment, the network 104 is the Internet. The Internet, which is a global web of interconnected computers and computer networks, integrates local area networks (LANs) located in various entities, such as businesses, libraries, federal agencies, institutes of learning, and research organizations into a single communication network. The Internet uses a common communication protocol suite, known as a Transmission Control Protocol/Internet Protocol (TCP/IP), which was specifically designed for the interconnection of different computer systems. Internal and external networks are linked by routers that route data packets from a sending network to another router or a receiving network. Gateways handle data transfer and conversion of messages from a sending network to the protocols used by a receiving network. Typically, gateways refer to devices that translate between applications. For example, e-mail gateways translate messages from one vendor's messaging program to another vendor's messaging program so that users with different e-mail programs can share messages over a network.

Figure 2:
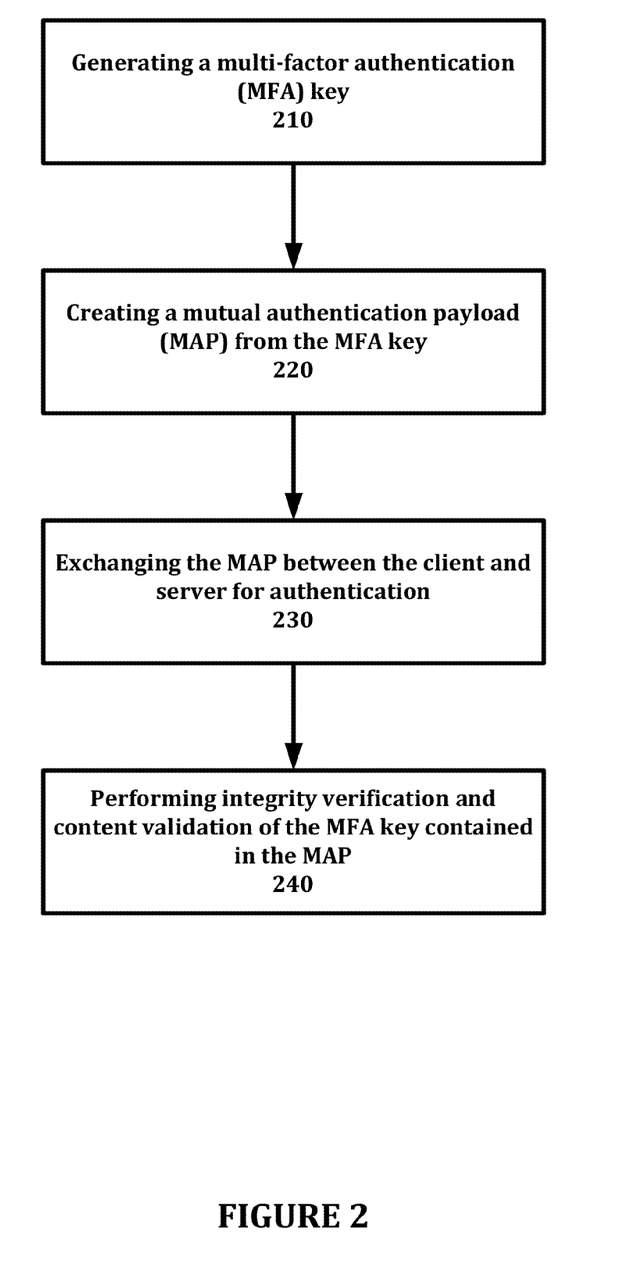
FIG. 2 shows a flowchart of a method in accordance with an embodiment.

FIG. 2 illustrates a flowchart in accordance with an embodiment of the present invention. Step 210 involves generating a multi-factor authentication (MFA) key. A second step 220 involves creating a mutual authentication payload (MAP) from the MFA key. A third step 230 involves exchanging the MAP between the client and server for authentication. A final step 240 involves performing integrity verification and content validation of the MFA key contained in the MAP.

Step 210 includes the generation of an MFA key. In an embodiment, the MFA key is generated at the client side and at the server side and is a composite authentication credential built from a plurality of authentication factors. This plurality of authentication factors include, but is not limited to, a 'what you know' authentication factor, a 'what you have' authentication factor and a 'what you are' authentication factor.

The 'what you know' authentication factor can be a fixed set of credentials such as a username; password or a server-id/password.

The 'what you have' authentication factor can be derived from a unique device such as a specialized hardware unit, a specific workstation computer or any other type of mobile device. In an embodiment, the unique device generates an alpha-numeric one-time password (OTP). On the client side, a unique sequence of OTPs associated with the client can be generated from a token device. A token device can be a smart card, a universal serial bus, a mobile phone, etc. and typically includes a microcontroller, an operating system, a security application, and a secured storage area.

The 'what you are' authentication factor is a defining characteristic of the entity. On the server side, this may be represented by a set of URLs, IP addresses of a server(s) in the network and details of the legitimate SSL certificate of the website. In an internet system, these credentials uniquely identify the server. On the client side, this may be represented by a digital footprint of the client. In an internet system, the characteristics of the client entity, the preferred digital transaction terminal, and other such parameters uniquely identify the client.

It should be understood that although three authentication factors are described, a variation of the authentication factors could be employed. For example, a combination of any two of the above-described factors could be implemented to generate the MFA key. Additionally, all three factors could be utilized to generate the MFA key in a custom Abstract Syntax Notation (ASN) structure, ASN is a standard and flexible notation that describes data structures for representing, encoding, transmitting, and decoding data. It provides a set of formal rules for describing the structure of objects that are independent of machine-specific encoding techniques and is a precise, formal notation that removes ambiguities.

Step 220 involves creating a mutual authentication payload (MAP) from the MFA key. In an embodiment, this step can be further delineated into the process steps shown in FIG. 3, each step being described in further detail herein below. A first step 221 involves implementing a client side key pair initialization and exchange. A next step 222 involves implementing a server side key pair initialization and exchange. In an embodiment, these exchanges employ an asymmetric cryptography scheme. Asymmetric cryptography is an encryption method that uses a two-part key: a public key and a private key. To send an encrypted message to someone, the recipient's public key is utilized, which can be transmitted via regular e-mail or made available on any public Web site or venue. To decrypt the message, the recipient uses the private key, which he or she keeps secret.

Figure 3:
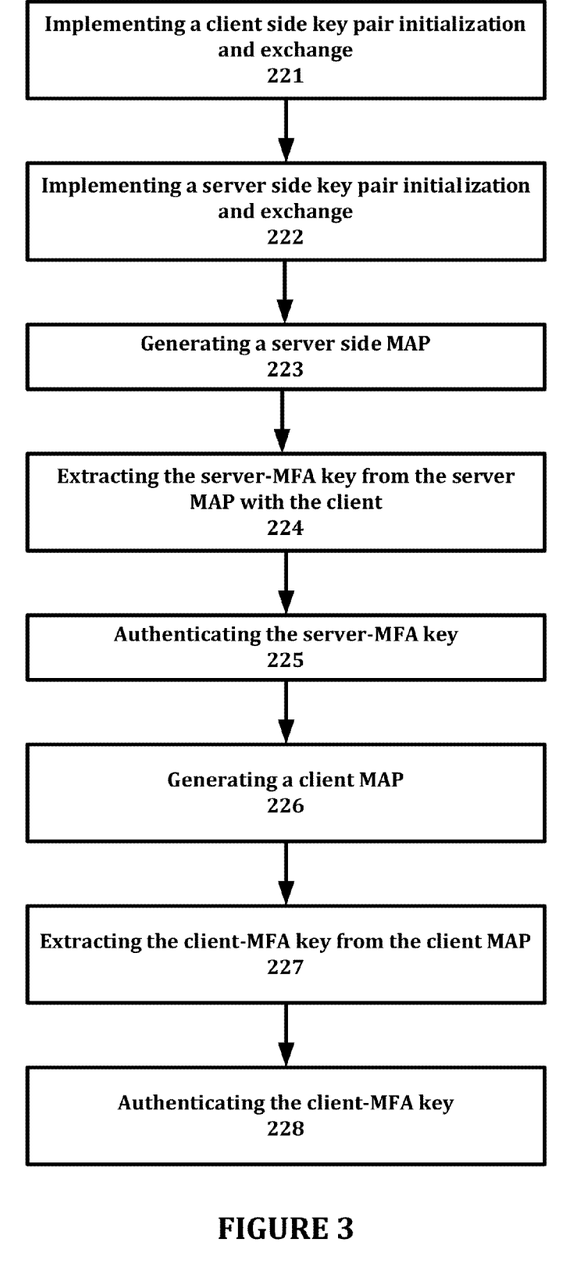
FIG. 3 shows a MAP creation process in accordance with an embodiment.

A next step 223 involves generating a server side MAP. Step 224 involves extracting the server-MFA key from the server MAP with the client. Step 225 involves authenticating the server-MFA key. Step 226 is generating a client MAP.

Step 227 involves extracting the client-MFA key from the client MAP. A final step 228 involves authenticating the client-MFA key.

An aspect of the invention includes initializing, storing and exchanging key pairs belonging to an asymmetric cryptography scheme between the client users and server. This enables roaming of client users without needing to physically carry the key-pair credentials. In the absence of key-pair credentials detected by the security plug-in at the client side, a method to establish client user's key-pair is initiated that challenges the user for an authorization code. Under this method a user obtains this authorization code from an out-of-band channel. An out-of-band channel is a channel that is physically or logically separate from the client and server channel of communication. It can be Mobile phone Text Message, Integrated Voice Response (IVR), e-mail, Unstructured Supplementary Service Data (USSD) service identified by the server system as originating uniquely from the client user.

The client security plug-in associated with the authorization code on the client system displays a challenge algorithmically derived from the client systems 102. The client user then transmits this challenge over the out-of-band channel with an optional pre-established password/PIN to receive the authorization code as a response from the server. The security plug-in accepts the authorization code input from the client user and communicates the input to the server system along with an auto generated container fingerprint of the client system 102 along with the displayed challenge. The container fingerprint is a sequence of bytes that uniquely identifies the client system 102 based on its distinguishing digital characteristics. The security plug-in transmits, in an encrypted fashion, the authorization code, the challenge and the container fingerprint using the public key of legitimate server to encrypt and thereby creating a virtual out-of-band channel. On a successful validation of these credentials submitted by the client security plug-in, a method of client and server key exchange is implemented as described in step 221 and 222.

Step 221—Client Side Key Pair Initialization and Exchange

Figure 4:
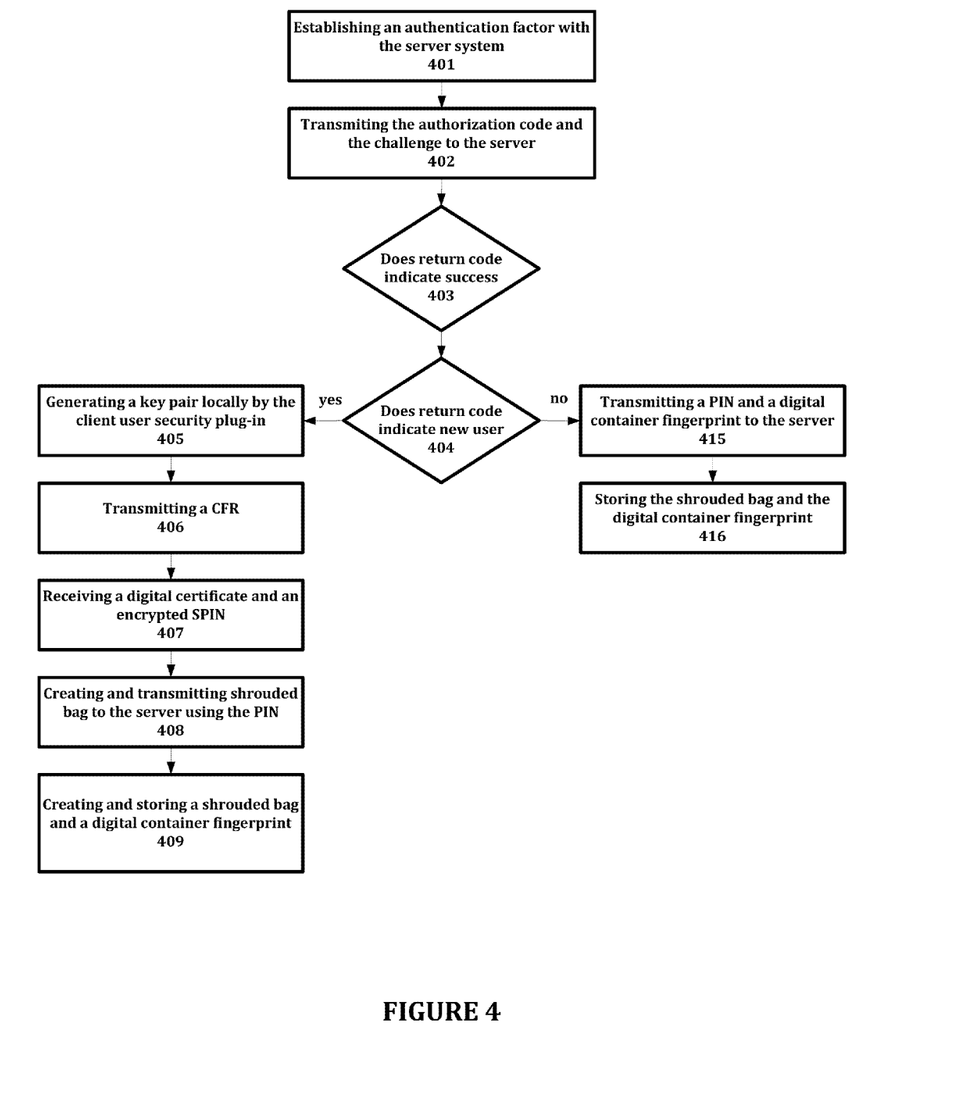
FIG. 4 shows a client-side key pair initialization and exchange process in accordance with an embodiment.
Figure 5:
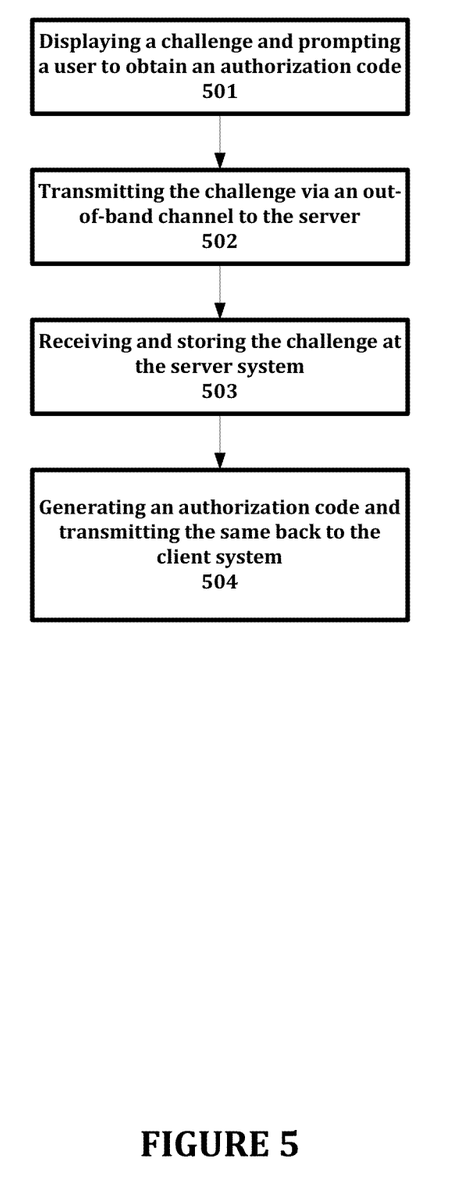
FIG. 5 illustrates an exemplary authentication establishment process in accordance with an embodiment.

With reference to FIG. 4, a client-side key pair initialization and exchange process is illustrated. Accordingly, step 401 involves establishing an authentication factor with the server system. In an embodiment, this authentication factor is a 'what you have' out-of-band authentication factor such as a registered mobile number of the client user that can send and receive Text Message to the server system. FIG. 5 illustrates an exemplary authentication establishment process. A first step 501 involves displaying a challenge and prompting a user to obtain an authorization code. In an embodiment, the challenge is computed algorithmically to uniquely identify the client system 102. Step 502 is transmitting the challenge via an out-of-band channel to the server. A next step 503 involves receiving and storing the challenge at the server system. A final step 504 is generating an authorization code and transmitting the same back to the client system.

Figure 6:
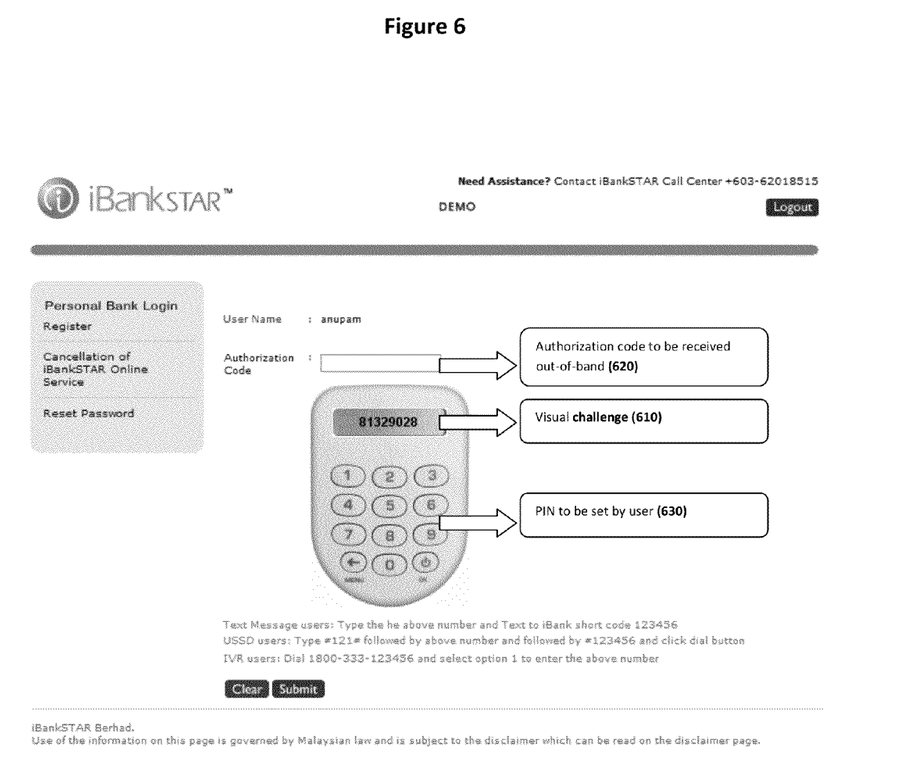
FIG. 6 illustrates an exemplary visual challenge configuration.

Now referring back to FIG. 4, in step 402, the user transmits the authorization code and the challenge to the server. In an embodiment, the challenge involves a visual interaction. FIG. 6 illustrates an exemplary visual challenge configuration 600 to further ensure and establish the identity of the user. The configuration 600 shows a challenge 610 for requesting an authorization code via a pre-established out-of-band channel for entry into the user interface 620. This ensures that a manual activity from a human interface is generally needed in this process and facilitates mitigation of a Man-in-the-Middle attack.

Next, step 403 determines if the return code is successful. If so, step 404 determines if the return code indicates a new user. Steps 405, 406, 407, 408, and 409 are executed if it is determined that this is an initialization step. Steps 415 and 416 are executed if it is established that this is a roaming user and a secure exchange of the key-par is necessary.

Step 405 involves generating a key pair locally by the client user security plug-in and step 406 involves transmitting a Certificate Signing Request (CSR). In an embodiment, a CSR is a request for Digital Certificate from a public key. The next step 407 involves receiving from the server a digital certificate and an encrypted server personal identification number (SPIN) using the public key of the user. In a next step 408, client software creates and transmits a shrouded bag to server using the SPIN received from the server. In an embodiment, the shrouded bag is a PKCS12 structure that contains the user Private Key along with the associated digital certificate(s) and other credentials.

At a next step 409, the client software creates and locally stores a shrouded bag protected by a composite passphrase generated algorithmically from the PIN (set by the user) and a digital container fingerprint of the client system 102. In an embodiment, the PIN (set by the user) is taken as an input from the user on a key pad as depicted in FIG. 5, 530. It should be noted that extraction of the private key from the shrouded bag is not possible if either the PIN or the digital container fingerprint is incorrect. This approach ensures that the validity and usability of the shrouded bag is only within the specific client system 102 on this the key-pair initialization has been effected. Step 410 involves transmitting a PIN (set by the user) and a digital container fingerprint derived by the client security plug-in uniquely identifying the client system 102. This transmission is secured by encrypting the PIN and the container fingerprint using the server system Public Key. Step 411 involves storing the shrouded bag based on the PIN and the digital fingerprint.

Alternatively, if step 404 does not indicate a new user, step 415 involves transmitting a PIN and a digital container fingerprint to the server. In an embodiment, this transmission is encrypted by the server's public key. Step 416 involves storing the shrouded bag and the digital container fingerprint. Here, the shrouded bag is protected by the PIN.

Step 222—Server Side Key Pair Initialization and Exchange

Figure 7:
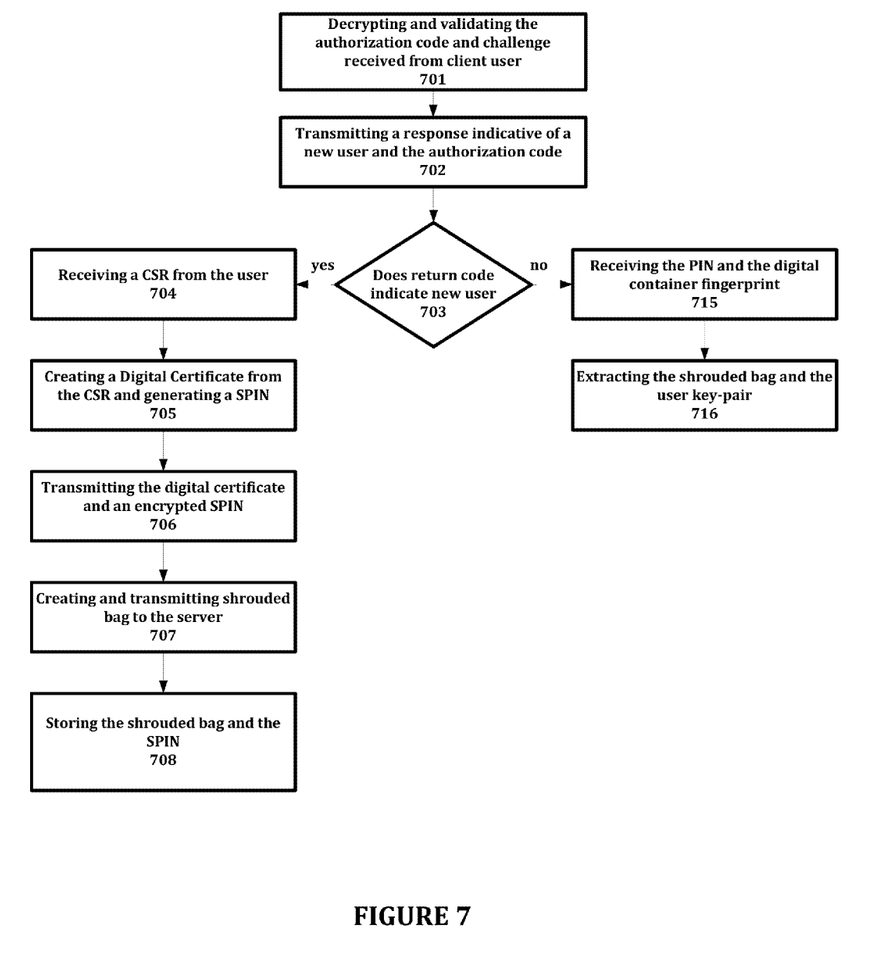
FIG. 7 illustrates a server-side key pair initialization and exchange process in accordance with an embodiment.

With reference to FIG. 7, a server-side key pair initialization and exchange process is illustrated. Accordingly, step 701 involves decrypting and validating the authorization code and challenge received from client user. In an embodiment, the decryption is accomplished with the private key of the server. Step 702 involves transmitting a response indicative of a new user and the authorization code if challenge validation is successful. In an embodiment, a response is transmitted back to the client security plug-in with the status of authentication factor establishment and a response to establish if this is a new client user that needs key pair initialization.

Step 703 determines if a new user is on the system. Steps 704, 705, 706, 707 and 708 are executed if it is determined that it is a new user whereas steps 715 and 716 are executed if it is determined that this is a roaming user and a secure exchange of the key-par is needed.

A next step 704 involves receiving a CSR from the user. The next step 705 creates a Digital Certificate from the CSR and generates a random server personal identification number (SPIN). This digital certificate and the SPIN are transmitted securely in the next step 706. In an embodiment, the encryption is done using the client user Public Key extracted from the Digital Certificate. In a next step 707, client software creates and transmits a shrouded bag to server that was created using the SPIN. In a step 708, the shrouded bag and the SPIN are securely stored in any form of electronic media persistent storage for purpose of facilitating roaming client users. In an embodiment, the SPIN of the shrouded bag is stored securely by encrypting it with a key that is protected in an HSM (Hardware Security Module).

Referring back to step 703, if it is determined that it is not a new user, step 715 involves receiving the encrypted PIN (set by the user) and the digital container fingerprint. In an embodiment, the PIN and container fingerprint is encrypted using an asymmetric cryptography public key encryption algorithm using the Public Key of the legitimate server and decrypted by the server using its Private Key. In step 716, the server extracts the client user shrouded bag and extracts the user key-pair using the SPIN. This extracted key-pair is secured in a shrouded bag using a composite of the PIN and the container fingerprint and transmitted back to the client user security plug-in. In an embodiment, the shrouded bag is a PKCS12 protected by the SPIN (Refer to steps 705, 706, 707, 708). The SPIN is stored encrypted using the Public Key of the server and the Server key pair is protected in an HSM device.

Steps 223-225 Server to Client Side MAP Creation/Extraction/Authentication

Figure 8:
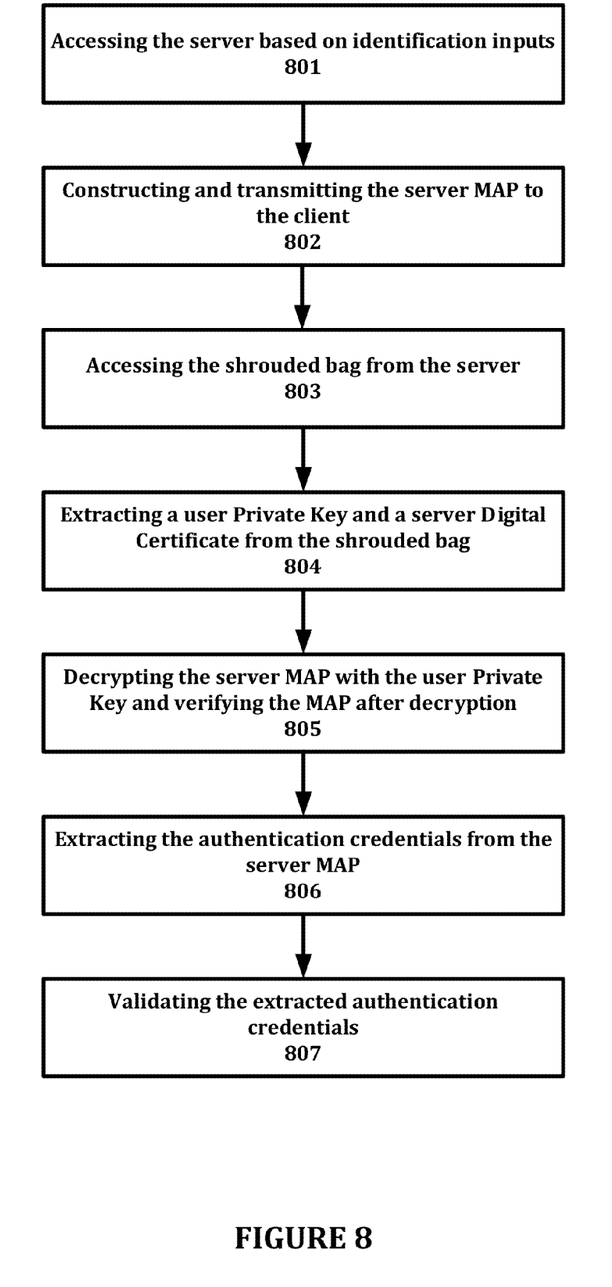
FIG. 8 illustrates a server-side MAP creation/extraction/authentication process in accordance with an embodiment.

With reference to FIG. 8, a server-side MAP creation/extraction/authentication process is illustrated. A first step 801 involves accessing the server system based on identification inputs. In an embodiment these user inputs could be, for example, name, user ID, PIN, etc. A next step 802 is constructing and transmitting the server MAP to the client. At step 803, the server accesses its Public and Private keys from a shrouded bag on the server. In an embodiment, this shrouded bag is symbolic to an HSM that securely contains the server Public and Private keys. Once the shrouded bag is validated, an MFA key of server is encrypted using user Public key to create the MAP and a digital signature of the MAP is created using server Private key. The MAP and the digital signature of MAP is transmitted to client. The next step 804 includes the client security plug-in extracting a user Private Key and a server Digital Certificate from the locally stored shrouded bag. A next step 805 is decrypting the server MAP with the user Private Key and verifying the MAP digital signature after decryption using server Public Key. A next step 806 is extracting the authentication credentials from the decrypted server MAP. In an embodiment, the MFA key authentication credentials include 'what you know', 'what you have' and 'what you are' credentials.

A final step 807 is validating the extracted authentication credentials. In an embodiment, an ActiveX/Netscape Plug-in or Java Applet is embedded in the session initiation (login) page of the Internet system. This security plug-in consumes the MAP received within the web-page. The signature is verified using an asymmetric cryptography scheme Digital signature algorithm whereby the client entity uses legitimate server's public key to verify the Digital Signature of MAP and decrypts the MAP using client entity's private key. Should there be any error in Digital Signature verification or MAP decryption, the session is marked un-trusted and terminated.

Steps 226-228 Client to Server MAP Creation/Extraction/Authentication

Figure 9:
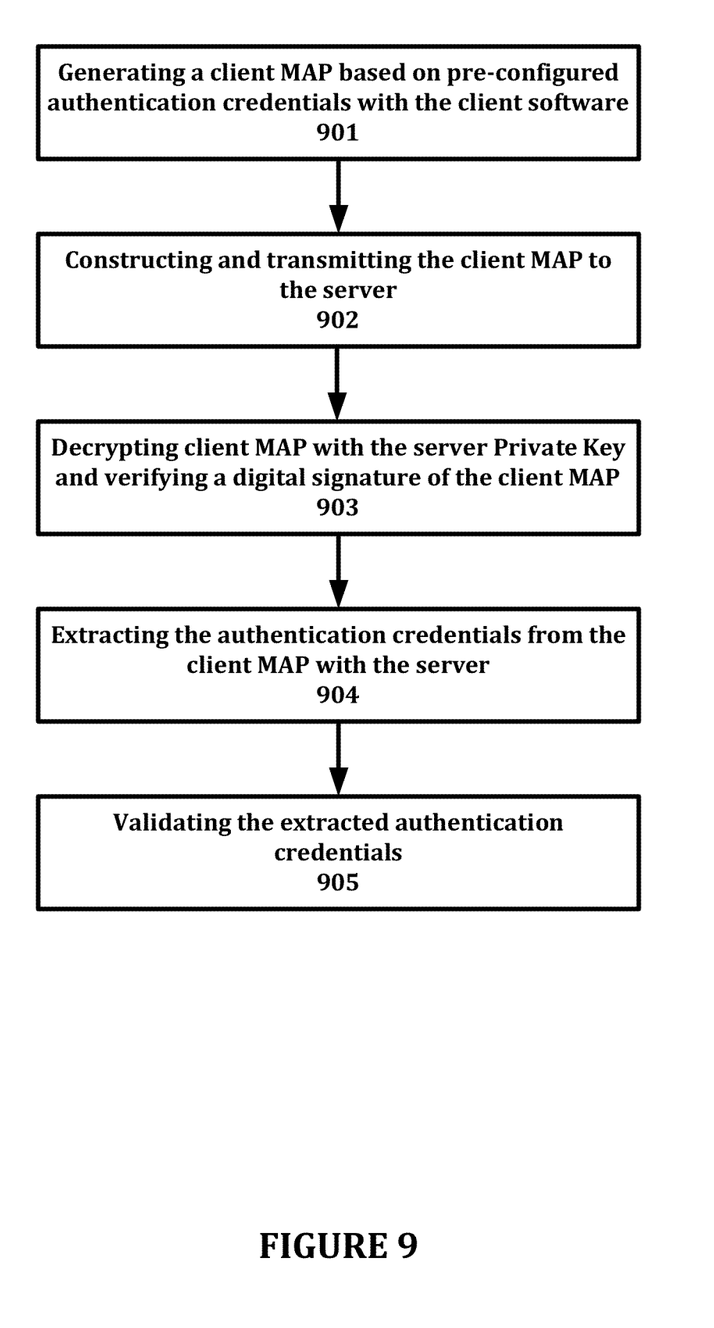
FIG. 9 illustrates a client-side MAP creation/extraction/authentication process in accordance with an embodiment.

With reference to FIG. 9, a client-side MAP creation/extraction/authentication process is illustrated. Accordingly, a first step 901 involves generating a client MAP based on preconfigured authentication credentials with the client software. In an embodiment these pre-configured authentication credentials could be, for example, username/password, OTP, digital container fingerprint, etc. At next step 902 is constructing and transmitting the client MAP to the server. In this step the client security plug-in extracts the user Private Key and Server Public key from the locally stored shrouded bag (client system 102). The pre-configured authentication credentials, i.e. the MFA key of client input by user and/or derived by the security plug-in are encrypted using Server Public key to create the server MAP and it is digitally signed using the user Private key. The MAP and the digital signature of MAP is transmitted to server. At step 903, the server decrypts the client MAP with the server Private Key and verifies a digital signature of the client MAP using the Public key (Digital certificate of user).

Step 904 includes extracting the authentication credentials from the client MAP with the server. In an embodiment, the authentication credentials include 'what you know', 'what you have' and 'what you are' credentials. A final step 905 involves validating the extracted authentication credentials. In an embodiment, a security plug-in SDK provides the service to the session initiation (login) page of the internet system. This security plug-in SDK consumes the client MAP. The signature can then be verified using an asymmetric cryptography digital signature algorithm whereby the server entity uses the public key of the legitimate client to verify the digital signature of the MAP and decrypts the MAP using the server entity's private key. Should there be any error in verification or decryption, the session is marked un-trusted and terminated.

A method for authenticating a communication channel between a client and server has been disclosed. The method employs a mutual authentication payload (MAP) protocol that enables mutual authentication between a client and server system in a convenient user-friendly manner while providing seamless and automated portability to the clients. In the process of mutual authentication, the client verifies that the server entity is indeed the intended entity and is trusted. Likewise, the server verifies if the client entity initiating the exchange is indeed the intended entity and is trusted. Accordingly, this verification process involves multi-factor authentication factors contained within the MAP protocol.

The above-described embodiment may also be implemented, for example, by operating a computer system to execute a sequence of computer readable instructions. Accordingly, client device 102 typically includes at least some form of computer readable media. Computer readable media can be any available media that can be accessed by computing device 102. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by computing device 102.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components to perform the method steps outlined above.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although these inventive concepts have been described in terms of certain embodiments, other embodiments that are apparent to those of ordinary skill in the art are also within the scope of this invention, as defined in the claims that follow.

What is claimed is:

1. A method for authenticating a communication channel between a client and server comprising:
   the sequential steps of:
   generating a mutual authentication payload (MAP) by encrypting a multi-factor authentication (MFA) key; and
   exchanging the MAP between the client and server along with its digital signature using a prior exchanged asymmetric key-pair via an out-of-band channel between the client and server; wherein the exchanging step comprises of:
   transmission of a server side MAP, extracting a server-MFA key by decrypting the MAP, authenticating the server-MFA key and verification of decrypted server-MFA key's integrity by verification of digital signature accompanying the server MAP, generating a client side MAP, extracting a client-MFA key by decrypting the client-MAP at the server, authenticating the client-MFA key and verification of decrypted client-MFA key's integrity by verification of digital signature accompanying the client MAP at server side; wherein an establishment of the sender (client) key-pair on a target workstation computer comprises:
   verifying the identity of the client using an independent out-of-band channel such as Text Message, USSD, e-mail, but not limited to these;
   installing the key-pair of the client encrypted with a key derived from a container fingerprint unique to the target workstation computer.

2. The method of claim 1 wherein the MFA key is a composite authentication credential built from a plurality of authentication factors.

3. The method of claim 2 wherein the plurality of authentication factors comprises one of at least a 'what you know', 'what you have' and 'what you are' authentication factor.

4. The method of claim 3 further comprising establishing the plurality of authentication factors wherein establishing the plurality of authentication factors comprises:
   creating a first authentication factor;
   creating a second authentication factor; and
   creating a third authentication factor.

5. The method of claim 4 wherein the first authentication factor comprises the 'what you know' authentication factor.

6. The method of claim 4 wherein the second authentication factor comprises the 'what you have' authentication factor.

7. The method of claim 4 wherein the third authentication factor comprises the 'what you are' authentication factor.

8. The method of claim 5 wherein the 'what you know' authentication factor comprises an alphanumeric password between the client system and the server system.

9. The method of claim 6 wherein the 'what you have' authentication factor comprises a One-Time Password (OTP).

10. The method of claim 9 wherein the OTP is generated from a unique device wherein the unique device comprises at least one of a specialized hardware unit, a specific workstation computer and a mobile device.

11. The method of claim 7 wherein the 'what you are' authentication factor comprises a digital fingerprint.

12. The method of claim 10 wherein the digital fingerprint is generated as a behavioral characteristic of either the sender or the recipient.

13. The method of claim 11 wherein the behavioral characteristics comprises:
   digital, geographical and habitual characteristics for the sender and recipient server.

14. The method of claim 1 wherein the MAP received from the server is decrypted using a private key of the client.

15. The method of claim 14 wherein the MAP is accompanied with a digital signature capable of being verified with a private key of a recipient.

16. The method of claim 14 wherein the decrypted MFA key contents are verified to establish the identity of a communicating server.

17. The method of claim 1 wherein a MAP is constructed from an MFA key generated by the sender and transmitted to recipient along with its digital signature.

18. The method of claim 17 wherein the MAP construction comprises of:
   encrypting an MFA key of the sender with a Public key of the server;
   and transmitted along with digital signature of the MAP.

19. The method of claim 18 wherein the MAP generated by the client is authenticated by the server before establishing a successful communication channel.

20. A non-transitory computer-readable medium having computer-executable instructions for authenticating a communication channel between a client and server, the instructions comprising:
   the sequential steps of:
   generating a mutual authentication payload (MAP) multi-factor authentication (MFA) key; and
   exchanging the MAP between the client and server along with its digital signature using a prior exchanged asymmetric key-pair via an out-of-band channel between the client and server; wherein the exchanging step comprises of:
   transmission of a server side MAP, extracting a server-MFA key by decrypting the MAP, authenticating the server-MFA key and verification of decrypted server-MFA key's integrity by verification of digital signature accompanying the server MAP, generating a client side MAP, extracting a client-MFA key by decrypting the client-MAP at the server, authenticating the client-MFA key and verification of decrypted client-MFA key's integrity by verification of digital signature accompanying the client MAP at server side;
   wherein an establishment of the sender (client) key-pair on a target workstation computer comprises:
   verifying the identity of the client using an independent out-of-band channel such as Text Message, USSD, e-mail, but not limited to these;

installing the key-pair of the client encrypted with a key derived from a container fingerprint unique to the target workstation computer.

21. The non-transitory computer-readable medium of claim 20 wherein the MFA key is a composite authentication credential built from a plurality of authentication factors.

22. The non-transitory computer-readable medium of claim 21 wherein the plurality of authentication factors comprises one of at least a 'what you know', 'what you have' and 'what you are' authentication factor.

23. The non-transitory computer-readable medium of claim 22 further comprising establishing the plurality of authentication factors wherein establishing the plurality of authentication factors comprises:
creating a first authentication factor;
creating a second authentication factor; and
creating a third authentication factor.

24. The non-transitory computer-readable medium of claim 23 wherein the first authentication factor comprises the 'what you know' authentication factor.

25. The non-transitory computer-readable medium of claim 23 wherein the second authentication factor comprises the 'what you have' authentication factor.

26. The non-transitory computer-readable medium of claim 23 wherein the third authentication factor comprises the 'what you are' authentication factor.

27. The non-transitory computer-readable medium of claim 24 wherein the 'what you know' authentication factor comprises an alphanumeric password between the client system and the server system.

28. The non-transitory computer-readable medium of claim 25 wherein the 'what you have' authentication factor comprises a One-Time Password (OTP).

29. The non-transitory computer-readable medium of claim 28 wherein the OTP is generated from a unique device wherein the unique device comprises at least one of a specialized hardware unit, a specific workstation computer and a mobile device.

30. The non-transitory computer-readable medium of claim 21 wherein the 'what you are' authentication factor comprises a digital fingerprint.

31. The non-transitory computer-readable medium of claim 30 wherein the digital fingerprint is generated as a behavioral characteristic of either the sender or the recipient.

* * * * *